May 6, 1947.  H. L. BOWDITCH  2,420,282
PRESSURE OPERATED SWITCH
Filed April 21, 1944
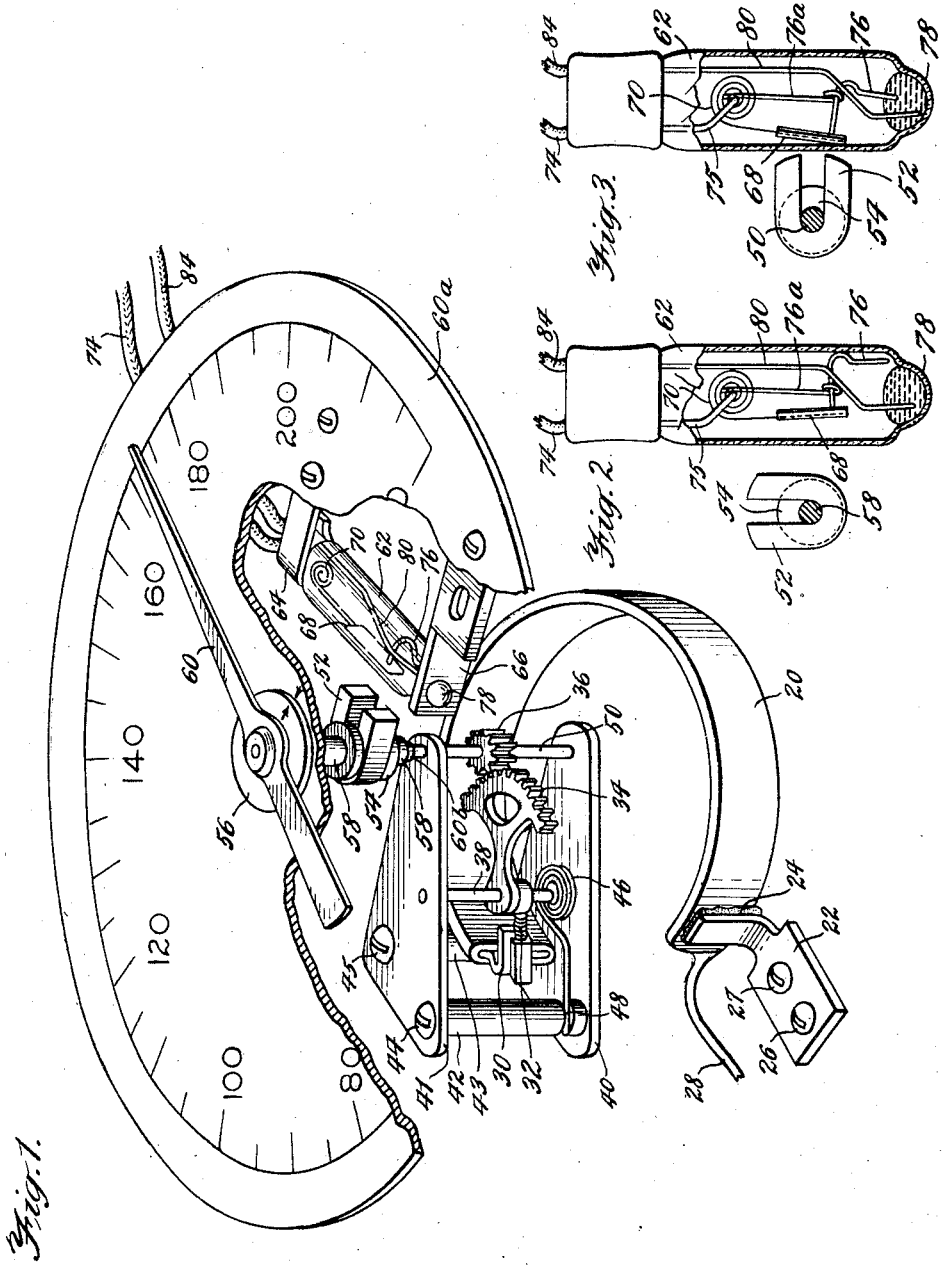
INVENTOR.
Hoel L. Bowditch
BY
Blair, Curtis & Hayward
ATTORNEYS Patented May 6, 1947

UNITED STATES PATENT OFFICE 2,420,282

PRESSURE OPERATED SWITCH

Hoel L. Bowditch, Sharon, Mass., assignor to The Foxboro Company, Foxboro, Mass., a corporation of Massachusetts Application April 21, 1944, Serial No. 532,191

2 Claims. (Cl. 200—81.8)

This invention relates to indicating, recording and controlling apparatus and more particularly to alarm systems therefor to indicate high or low pressure, temperature or flow conditions or explosive mixtures, etc.

Such apparatus contains a measuring element which moves in accurate response to changes in the condition being indicated, recorded or controlled. But these measuring elements may have very little power to exert, in response to slight changes in the condition, to move even delicate, substantially frictionless, parts performing indicating or controlling functions. It is an object of the present invention to provide an alarm system for this apparatus without loading or otherwise binding or interfering with the normal action of the measuring element in its responsive movements. It is a further object to accomplish such object without any mechanical connection between the measuring element and the alarm system.

In the drawings, in which one satisfactory form of the invention is used by way of illustration:

Figure 1 is a perspective view taken at an angle from below and with parts broken away, of a thermometer embodying the invention;

Figure 2 is a fragmentary elevational view with parts in section of a switch portion of the thermometer illustrated in Figure 1, the switch being open; and Figure 3 is a view similar to that of Figure 2 but showing the parts in the position which they assume when the switch is closed.

The invention accordingly consists in the features of construction, combinations of elements, and arrangements of parts as will be exemplified by the structure to be hereinafter described and the scope of the application of which will be set forth in the accompanying claims.

In the embodiment here described, the invention is applied to an indicating thermometer. This thermometer is of a simple conventional construction wherein a pointer is actuated by the movement of the free end of a Bourdon tube in accordance with temperature changes. Such a system is advantageous in that it may be constructed to respond accurately to very small changes in temperature. It has the disadvantage of such systems, however, of providing only a relatively weak actuating force to operate the pointer for small temperature changes. Thus, whereas the free end of the Bourdon tube will respond very accurately, when unrestrained, to changes in condition at the thermometer bulb, the tube is so lacking in power that if the pointer mechanism is not made substantially frictionless, then the accuracy of the system is lost. And if a reliable alarm system is to be included and actuated by the Bourdon tube the construction of the alarm must be such as not to impose drag or friction on the movement of the free end of the Bourdon tube—otherwise the alarm system will introduce inaccuracy into the indicating mechanism and into the alarm system.

In Figure 1, a Bourdon tube 20 is indicated attached to a bracket 22 by means of brazing 24. Bracket 22 is secured by screws 26 and 27 to a part of an instrument case not shown. The Bourdon tube is connected through capillary tubing 28 to a temperature responsive thermometer bulb not shown. The Bourdon tube, capillary tubing and thermal bulb are filled with fluid and sealed. Variation of the temperature of the fluid in the bulb varies the pressure in the system, and the Bourdon tube, which is the condition measuring element, moves in accordance with the pressure variation.

The free end of the Bourdon tube 20 carries a clip 30 provided with a conventional seat-forming depression (not shown) which cooperates with a ball-shaped portion (not shown) of lever 32. Lever 32 is threaded into a collar on a shaft 38 which also supports thereupon a sector gear 34. The shaft 38 is mounted in bearings and carried between plates 40 and 41 which are held in spaced-apart relationship by means of columns 42 and 43, and screws 44 and 45. A hairspring 46 is fastened to column 44 as at 48, and imparts a clockwise bias to shaft 38 so that ball-tipped lever 32 is held in light engagement with the seat-forming depression in the surface of clip 30. Sector gear 34 meshes with a pinion 36 on pointer shaft 50. Hence, as lever 32 responds to movements of the Bourdon tube, the movements are transferred by segment gear 34 and pinion 36 to the pointer shaft 50.

As shown in Figure 1, the upper end of the shaft 50 carries an extension shaft 60b to which the pointer 60 is fastened. The extension shaft is supported by the shaft 50 by means of a tapered press fit which in service causes the pointer to bear a fixed and unvarying relation to the shaft 50 and the pinion 36. However, the extension shaft 60b is removable for the purpose of performing repairs on the instrument.

The extension shaft 60b extends through a hole (hidden by setting wheel 56) in dial 60a and the index pointer 60 serves to indicate with the index on the dial 60a the value of the condition being measured.

Also carried by the extension 60b is a small magnet 52 which serves, when turned correctly (Figures 1 and 3) to close a conventional mercury switch 62 which is part of an alarm system. Operation of switch 62 actuates the alarm. The switch is supported between a clip 64 and a bracket 66, and includes an operating flapper 68 (see also Figures 2 and 3) carried by a hairspring 70. Referring to Figures 2 and 3 the operating flapper carries a rightwardly extending contact wire 76, movable into and out of a pool of mercury 78. A guide 76a directs the to and fro path of the contact wire 76. Electric current is supplied to the contact wire 76 through a terminal wire 74, a lead 75, the hairspring 70 and the operating flapper 68. The circuit continues through the mercury pool 78, a return wire 80, and a return terminal wire 84. Terminal wires 74 and 84 are a part of a conventional electrically operated alarm system.

Figure 2 shows the mercury switch with the circuit open and Figure 3 shows the switch with the circuit closed. In Figure 3 magnet 52 has been rotated to a position where its field pulls directly upon operating flapper 68, which is made responsive to the field of the magnet, and thus the operating flapper has been pulled against the action of the hairspring 70 to its extreme leftward position bringing contact wire 76 into engagement with mercury pool 78.

In Figure 2, the magnet has been turned by shaft 50, so that the action of the light hairspring 70 has overcome the pull of the magnet's magnetic field and consequently the operating flapper 68 has been moved to its rightward position and the contact wire 76 has been moved out of the pool 78.

The permanent horseshoe magnet 52 is so supported by the extension shaft 50b as to provide for angular adjustment of the magnet with respect to the shaft and to the pointer 60. To this end the magnet 52 is securely held by bushing 54 fixed to a sleeve 56 which is only friction tight on the extension shaft 50b. The setting wheel 58 which is fixed to the sleeve 56, and which is behind the pointer 60 but in front of the dial 60a, may be turned to adjust the angular position of the magnet with respect to the pointer 60. Hence the switch may be set to operate at any desired condition simply by proper positioning of the magnet 52 with respect to the pointer 60. An arrow on the setting wheel 58 indicates the position of the magnet.

It will be observed that correct operation of the type of mercury switch illustrated requires that the mercury switch always be positioned with its longitudinal axis parallel to the pull of gravity in order that the pool of mercury remain in the reservoir in the bottom of the glass envelope. The mounting of magnet 52 upon sleeve 56 is such that the axis about which the magnet rotates passes through, or very nearly through, the center of gravity of the magnet, and therefore, the effect of the mass of the magnet on the movement of the shaft 50 is reduced to a minimum. This relationship has the additional advantage that the pull of the magnet upon the contact flapper of the switch necessarily is effective through a relatively short moment arm with respect to the axis of the pointer shaft, so that a minimum of force is required for rotating the magnet from switch closing position to switch opening position, and such force as is required is made negligible. Therefore, such construction is useful in indicators and controllers of the type above-mentioned because the addition of the magnet and switch and accompanying alarm system does not impose upon the instrument the sluggishness or inaccuracy which was inherent in most of the alarm giving instruments heretofore available.

Other conventional condition sensitive measuring elements may be used to rotate the shaft 50 by suitable connections. Thus floats, diaphragm bellows, solenoids, etc., might be used all within the scope of the invention.

In alternative applications of the present invention, the alarm may advantageously be combined with an industrial process controller, where the need for accurate response to process condition changes may be paramount. The addition of the alarm system does not interfere with the desired control function of the controller.

The present invention thus makes provision for an alarm system which will close a circuit ringing a bell, or lighting a light, or in some other manner attracting the attention of an operator when a critical condition is reached. A part of the value of the invention resides in the fact that it may be incorporated in delicately responsive systems such as above mentioned without introducing error in the indicating, recording or controlling functions.

As many possible embodiments may be made of the above invention without departing from the scope thereof, and as changes will be necessitated in adapting the various embodiments to specific applications, it is to be understood that all matter herein set forth or shown in the accompanying drawings is to be interpreted as illustrative and not in a limiting sense.

I claim:

1. In apparatus for indicating, recording, or controlling a condition and employing a frictionless shaft rotatable through a range by a condition responsive element to positions corresponding to values of the condition, in combination, a switch including a magnetically operated switching member normally yieldingly urged by a light force to occupy one of two positions, and a magnet mounted on and movable by said frictionless shaft into and out of a switch operating position in which position the pull of the magnet on said switching member overcomes said force and moves the switching member to occupy the second of its two positions whereas when said magnet is not in said switch operating position the pull of the magnet does not operate to overcome said force and the switching member is held in the first of said two positions, whereby said switch is operated when said condition responsive member moves the magnet into and out of said switch operating position, the center of gravity of said magnet falling substantially upon the axis about which said frictionless shaft rotates.

2. In apparatus for indicating, recording, or controlling a condition and employing a frictionless shaft rotatable through a range by a condition responsive element to positions corresponding to values of the condition, in combination, a switch including a magnetically operated switching member normally yieldingly urged by a light force to occupy one of two positions, a magnet mounted on and movable by said frictionless shaft into and out of a switch operating position in which position the pull of the magnet on said switching member overcomes said force and moves the switching member to occupy the second of its two positions whereas when said magnet is not in said switch operating position the pull of the magnet does not operate to overcome said force and the switching member is held in the first of said two positions, whereby said switch is operated as said condition responsive member moves the magnet into and out of said switch operating position, and a member for manually shifting said magnet with respect to said frictionless shaft to adjust the value of the condition that will cause the switch to operate.

HOEL L. BOWDITCH.

REFERENCES CITED

The following references are of record in the file of this patent:

UNITED STATES PATENTS

| Number | Name | Date |
|---|---|---|
| 2,109,953 | Bates | Mar. 1, 1938 |
| 2,226,287 | Miller | Dec. 24, 1940 |
| 2,333,263 | McCabe | Nov. 2, 1943 |
| 75,313 | Stern | Mar. 10, 1868 |
| 2,203,512 | Wesemann | June 4, 1940 |
| 2,012,153 | Bates | Aug. 20, 1935 |
| 2,251,129 | Hammond | July 29, 1941 |